(12) United States Patent
Chen

(10) Patent No.: US 10,222,652 B2
(45) Date of Patent: Mar. 5, 2019

(54) LIQUID CRYSTAL DISPLAY DEVICE

(71) Applicant: Shenzhen China Star Optoelectronics Technology Co., Ltd., Shenzhen (CN)

(72) Inventor: Lixuan Chen, Shenzhen (CN)

(73) Assignee: SHENZHEN CHINA STAR OPTOELECTRONICS TECHNOLOGY CO., LTD., Shenzhen, Guangdong (CN)

(*) Notice: Subject to any disclaimer, the term of this patent is extended or adjusted under 35 U.S.C. 154(b) by 189 days.

(21) Appl. No.: 15/109,125

(22) PCT Filed: Jun. 15, 2016

(86) PCT No.: PCT/CN2016/085778
§ 371 (c)(1),
(2) Date: Jun. 30, 2016

(87) PCT Pub. No.: WO2017/193442
PCT Pub. Date: Nov. 16, 2017

(65) Prior Publication Data
US 2018/0101066 A1 Apr. 12, 2018

(30) Foreign Application Priority Data

May 9, 2016 (CN) .......................... 2016 1 0302311

(51) Int. Cl.
*G02F 1/1335* (2006.01)
*G02B 5/30* (2006.01)
(Continued)

(52) U.S. Cl.
CPC ......... *G02F 1/133615* (2013.01); *G02B 5/30* (2013.01); *G02F 1/1339* (2013.01);
(Continued)

(58) Field of Classification Search
CPC .. G02B 6/0055; G02B 6/0068; G02B 6/0073; G02B 6/0088; G02B 6/0031;
(Continued)

(56) References Cited

U.S. PATENT DOCUMENTS 5,963,280 A * 10/1999 Okuda ................. G01C 21/365
349/64
6,103,323 A * 8/2000 Motomura ............. C08F 20/36
252/299.01

(Continued)

FOREIGN PATENT DOCUMENTS

| CN | 1162759 A | 10/1997 |
|---|---|---|
| CN | 1412609 A | 4/2003 |

*Primary Examiner* — Thoi Duong
(74) *Attorney, Agent, or Firm* — Leong C. Lei

(57) ABSTRACT

The present invention provides an LCD device, which includes a lower substrate (10) and an upper substrate (20) opposite to each other, a liquid crystal layer (30) interposed between the lower substrate (10) and the upper substrate (20), and a side-edge backlight source (40) disposed at one lateral side of the lower substrate (10). The lower substrate (10) includes a first backing base plate (11) and a first polarization layer (13) disposed on one side of the first backing base plate (11) that is adjacent to the liquid crystal layer (30). The upper substrate (20) is a TFT array substrate. By making use of the advantages of the lower substrate of being simple in respect of the manufacturing process and the structure over those of the TFT array substrate, the arrangement of the first polarization layer provided on the lower substrate could be made an internally built structure with the first backing base plate of the lower substrate serving as a light guide plate for the side-edge backlight source so that there is no need to further include an additional light guide plate and thus making the LCD device feature an ultrathin modular structure with optimized displaying performance.

15 Claims, 1 Drawing Sheet

(51) Int. Cl.
*G02F 1/1339* (2006.01)
*G02F 1/1343* (2006.01)
*G02F 1/1368* (2006.01)
*G02F 1/1333* (2006.01)
*G02F 1/1362* (2006.01)

(52) U.S. Cl.
CPC ........ *G02F 1/1368* (2013.01); *G02F 1/13439* (2013.01); *G02F 1/133514* (2013.01); *G02F 1/133528* (2013.01); *G02F 1/133553* (2013.01); *G02F 2001/133302* (2013.01); *G02F 2001/133357* (2013.01); *G02F 2001/133567* (2013.01); *G02F 2001/136222* (2013.01)

(58) Field of Classification Search
CPC ...... G02B 6/009; G02B 6/005; G02B 6/0051; G02B 6/0043; G02B 6/0091; G02B 6/0011; G02B 6/00; G02B 6/0001; G02B 19/0061; G02B 19/0047; G02B 5/0231; G02B 5/0226; G02B 5/0289; G02B 5/30; G02B 26/0833; G02F 1/133615; G02F 1/133514; G02F 1/133528; G02F 1/133603; G02F 1/1368; G02F 1/133504; G02F 1/1336; G02F 1/133605; G02F 1/133606; G02F 1/133553; G02F 1/133524; G02F 1/133536; G02F 1/133555; G02F 1/1362; G02F 2001/133614; G02F 2001/133507; G02F 1/1335; G02F 1/133502; H01L 33/60
USPC .... 349/65, 62, 61, 42, 43, 96, 106, 123, 64, 349/153, 113, 114; 362/612, 606, 97.1, 362/609, 19, 327, 611, 615, 84, 97.3; 257/98

See application file for complete search history.

(56) References Cited

U.S. PATENT DOCUMENTS

| | | | | |
|---|---|---|---|---|
| 7,315,342 B2* | 1/2008 | Kuo | ...................... | G02F 1/1345 349/106 |
| 9,829,738 B2* | 11/2017 | Wu | ................... | G02F 1/133504 |
| 2006/0132696 A1* | 6/2006 | Chen | ..................... | G02F 1/1339 349/153 |
| 2006/0290272 A1* | 12/2006 | Haenichen | .......... | H01L 51/5275 313/504 |
| 2008/0225506 A1* | 9/2008 | Huang | ................ | G02B 6/0056 362/19 |
| 2017/0276999 A1* | 9/2017 | Yoon | ................. | G02F 1/133345 |

* cited by examiner

LIQUID CRYSTAL DISPLAY DEVICE

BACKGROUND OF THE INVENTION

1. Field of the Invention

The present invention relates to the field of liquid crystal display technology, and in particular to a liquid crystal display (LCD) device.

2. The Related Arts

Liquid crystal displays (LCDs) have a variety of advantages, such as thin device body, low power consumption, and being free of radiation, and thus have wide applications. Most of the LCDs that are currently available in the market are backlighting LCDs, which comprise a liquid crystal display panel and a backlight module. The liquid crystal display panel is generally made up of a color filter (CF) substrate, a thin-film transistor (TFT) array substrate, and a liquid crystal (LC) layer interposed between the CF substrate and the TFT array substrate, and sealant.

The working principle of the liquid crystal display panel is that liquid crystal molecules are positioned between two parallel glass substrates and electricity is applied to the glass substrates to control the orientation of the liquid crystal molecules and thus varying polarization state of light from the backlight module. Polarization plates are arranged on opposite sides of the liquid crystal display panel to determine passage or blocking of the light therethrough thereby achieving control of the amount of light transmitting therethrough. With a color resist layer filtering and absorbing light that transmits through the liquid crystal layer, light emitting from each of pixels is composed of three primary colors, red (R), green (G), and blue (B) and different ones of the pixels may emit different colors of light. Full color displaying may thus be achieved through spatial color mixture. Obviously, polarized light and three primary colors of R, G, and B are two vital factors for displaying.

Heretofore, polarization plates that are commonly used are of two types, namely iodine series and dye series, of which the manufacture is that a polymeric film, such as polyvinyl alcohol (PVA), is dipped in a solution containing polyvalent iodine ions or polarizing dyes and PVA polymer is stretched un-axially. PVA molecules, when stretched by an external force, will align in a specific direction to allow the iodine ions or dye molecules attached on the PVA molecules to line up in the same direction as that of the PVA molecules. The thin and elongate iodine ions or dye molecules, after the stretching, will absorb light that is polarized in a direction substantially parallel to a major axis of iodine ions, but allows light having a polarization direction that is perpendicular to the major axis of the iodine ions. In other words, a polarization plate exhibiting light polarization is formed. Further, metal grating structure based polarization plates also find applications in liquid crystal displaying.

Ultrathin displays are a market hot spot and it is an essential challenge of engineering to make the thickness of a display, such as a mobile phone and a television, even reduced.

SUMMARY OF THE INVENTION

An object of the present invention is to provide a liquid crystal display (LCD) device that has an ultrathin LCD module structure that achieves optimized displaying.

To achieve the above object, the present invention provides an LCD device, which comprises a lower substrate and an upper substrate that are arranged opposite to each other, a liquid crystal layer arranged between the lower substrate and the upper substrate, enclosure sealant arranged on a peripheral position between the lower substrate and the upper substrate, and a side-edge backlight source disposed on one lateral side of the lower substrate;

wherein the lower substrate comprises a first backing base plate, a first polarization layer disposed on one side of the first backing base plate that is adjacent to the liquid crystal layer, and a light reflection film disposed on one side of the first backing base plate that is distant from the liquid crystal layer;

the first backing base plate comprises a lateral side surface and the side-edge backlight source is arranged to exactly correspond to the lateral side surface of the first backing base plate;

the first backing base plate comprises a bottom surface, and the bottom surface is a surface of the first backing base plate that is distant from the liquid crystal layer, the bottom surface being provided thereon with a plurality of microstructures, the light reflection film set on and covering the bottom surface and the plurality of microstructures; and the upper substrate is a thin-film transistor (TFT) array substrate and comprises a second backing base plate, a second function layer disposed on one side of the second backing base plate that is adjacent to the liquid crystal layer, and a second polarization layer disposed on one side of the second backing base plate that is distant from the liquid crystal layer.

The lower substrate further comprises a first function layer disposed on one side of the first backing base plate that is adjacent to the liquid crystal layer; and the first function layer comprises an ITO electrode layer.

The first polarization layer is disposed between the first backing base plate and the first function layer; and the lower substrate further comprises a planarization layer disposed between the first polarization layer and the first function layer.

The lower substrate further comprises a refraction layer disposed between the first polarization layer and the first backing base plate and the refraction layer has a refractive index that is greater than a refractive index of the first backing base plate.

The first polarization layer is disposed between the first function layer and the liquid crystal layer.

The lower substrate further comprises a first function layer disposed on one side of the first backing base plate that is adjacent to the liquid crystal layer; and the first function layer comprises a color filter sheet.

The second function layer comprises a TFT array layer and also comprises a color filter sheet.

The enclosure sealant comprises an ultraviolet (UV) curable resin material.

The first polarization layer and the second polarization layer are each an iodine series polarization layer or a dye series polarization layer.

The first backing base plate and the second backing base plate are glass plates

The present invention also provides an LCD device, which comprises a lower substrate and an upper substrate that are arranged opposite to each other, a liquid crystal layer arranged between the lower substrate and the upper substrate, enclosure sealant arranged on a peripheral position between the lower substrate and the upper substrate, and a side-edge backlight source disposed on one lateral side of the lower substrate;

wherein the lower substrate comprises a first backing base plate, a first polarization layer disposed on one side of the first backing base plate that is adjacent to the liquid crystal layer, and a light reflection film disposed on one side of the first backing base plate that is distant from the liquid crystal layer;

the first backing base plate comprises a lateral side surface and the side-edge backlight source is arranged to exactly correspond to the lateral side surface of the first backing base plate;

the first backing base plate comprises a bottom surface, and the bottom surface is a surface of the first backing base plate that is distant from the liquid crystal layer, the bottom surface being provided thereon with a plurality of microstructures, the light reflection film set on and covering the bottom surface and the plurality of microstructures; and the upper substrate is a thin-film transistor (TFT) array substrate and comprises a second backing base plate, a second function layer disposed on one side of the second backing base plate that is adjacent to the liquid crystal layer, and a second polarization layer disposed on one side of the second backing base plate that is distant from the liquid crystal layer;

wherein the enclosure sealant comprises an ultraviolet (UV) curable resin material;

wherein the first polarization layer and the second polarization layer are each an iodine series polarization layer or a dye series polarization layer; and wherein the first backing base plate and the second backing base plate are glass plates.

The efficacy of the present invention is that the present invention provides an LCD device, which makes use of the advantages of a lower substrate of being simple in respect of the manufacturing process and the structure over those of a TFT array substrate to make an arrangement of a first polarization layer provided on the lower substrate an internally built structure with a first backing base plate of the lower substrate serving as a light guide plate for a side-edge backlight source so that there is no need to further include an additional light guide plate and thus making the LCD device feature an ultrathin modular structure with optimized displaying performance.

BRIEF DESCRIPTION OF THE DRAWINGS

The technical solution, as well as other beneficial advantages, of the present invention will be apparent from the following detailed description of embodiments of the present invention, with reference to the attached drawing.

In the drawing.

DETAILED DESCRIPTION OF THE PREFERRED EMBODIMENTS

To further expound the technical solution adopted in the present invention and the advantages thereof, a detailed description is given to a preferred embodiment of the present invention with reference to the attached drawings.

Figure 1:
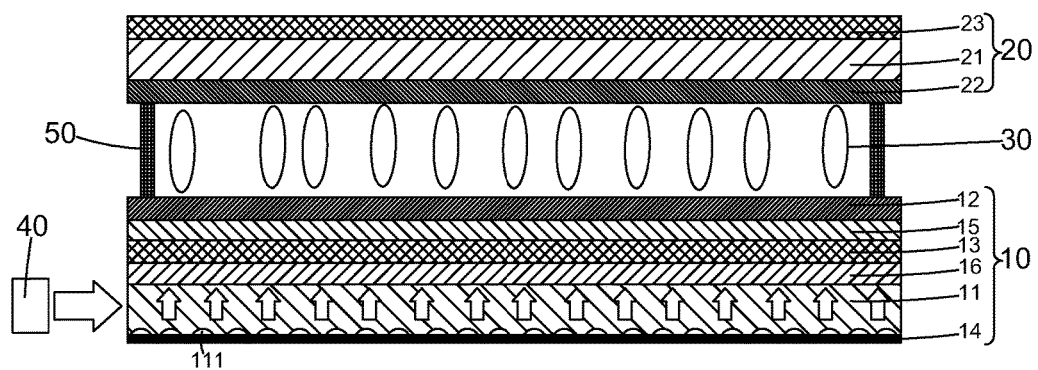
FIG. 1 is a schematic view illustrating the structure of a liquid crystal display (LCD) device according to a first embodiment of the present invention.

Referring to FIG. 1, which is a schematic view showing a liquid crystal display (LCD) device according to a first embodiment of the present invention, the LCD is a vertical alignment (VA) LCD and comprises a lower substrate 10 and an upper substrate 20 that are arranged opposite to each other, a liquid crystal layer 30 arranged between the lower substrate 10 and the upper substrate 20, enclosure sealant 50 arranged on a peripheral position between the lower substrate 10 and the upper substrate 20, and a side-edge backlight source 40 disposed on one lateral side of the lower substrate 10.

The lower substrate 10 comprises a first backing base plate 11, a first polarization layer 13 disposed on one side of the first backing base plate 11 that is adjacent to the liquid crystal layer 30, and a light reflection film 14 disposed on one side of the first backing base plate 11 that is distant from the liquid crystal layer 30.

The first backing base plate 11 has a lateral side surface. The side-edge backlight source 40 is arranged to exactly correspond to the lateral side surface of the first backing base plate 11.

The first backing base plate 11 has a bottom surface, and the bottom surface is a surface of the first backing base plate 11 that is distant from the liquid crystal layer 30. The bottom surface is provided thereon with a plurality of microstructures 111. The light reflection film 14 is set on and covers the bottom surface and the plurality of microstructures 111.

The upper substrate 20 is a thin-film transistor (TFT) array substrate and comprises a second backing base plate 21, a second function layer 22 disposed on one side of the second backing base plate 21 that is adjacent to the liquid crystal layer 30, and a second polarization layer 23 disposed on one side of the second backing base plate 21 that is distant from the liquid crystal layer 30.

Specifically, the lower substrate 10 further comprises a first function layer 12 disposed on one side of the first backing base plate 11 that is adjacent to the liquid crystal layer 30.

Specifically, the LCD is a VA type LCD, wherein the upper and lower substrates 10, 20 are respectively provided with electrode layers opposing each other. The first function layer 12 of the lower substrate 10 comprises an indium tin oxide (ITO) electrode layer, and the second function layer 22 of the upper substrate 20 comprises another ITO electrode layer.

Specifically, compared to the TFT array substrate that forms the upper substrate 20, the lower substrate 10 has a relatively simple process of manufacturing and the ITO electrode layer thereof can be formed with a sputtering process conducted at room temperature in order to protect the first polarization layer 13 from damage caused in a high temperature process.

Specifically, the enclosure sealant 50 comprises an ultraviolet (UV) curable resin material. Using UV curving, instead of heat curing, in the manufacturing process helps further protect the first polarization layer 13 from damage caused in a high temperature process.

Thus, the first polarization layer 13 that is formed as an internally built structure can be a regular polarization layer that is not resistant to high temperatures. Specifically, the first polarization layer 13 and the second polarization layer 23 can each be an iodine series polarization layer or a dye series polarization layer.

Specifically, in the present invention, the first backing base plate 11 of the lower substrate 10 may serve as a light guide plate. The lateral side surface of the first backing base plate 11 functions as a light incident surface corresponding exactly to the side-edge backlight source 40, wherein light undergoes total internal reflection in the first backing base plate 11 to achieve an effect of light mixture. Therefore, the lower substrate 10 further comprises a refraction layer 16 disposed between the first polarization layer 13 and the first backing base plate 11. The refraction layer 16 has a refractive index that is greater than a refractive index of the first backing base plate 11 in order to overcome a problem that the first polarization layer 13 may not meet the needs of the first backing base plate 11 for light mixture.

Preferably, the refraction layer 16 may comprise inorganic oxide material having a refractive index greater than 1.5.

Specifically, the lower substrate 10 is a color filter (CF) substrate. The first function layer 12 of the lower substrate 10 further comprises a color filter sheet arranged between the ITO electrode layer and the first polarization layer 13.

Specifically, since the first polarization layer 13 has a surface configuration that has relatively high roughness that leads to a relatively high potential risk of breaking of the ITO electrode layer formed on the lower substrate 10, the lower substrate 10 further comprises a planarization layer 15 disposed between the first polarization layer 13 and the first function layer 12 to prevent poor film formation during a manufacturing process of ITO.

Specifically, the first backing base plate 11 and the second backing base plate 21 are glass plates.

Figure 2:
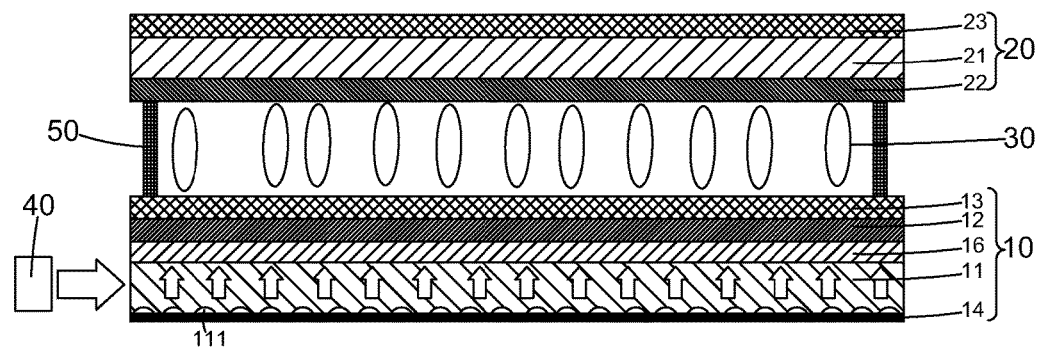
FIG. 2 is a schematic view illustrating the structure of an LCD device according to a second embodiment of the present invention.

Referring to FIG. 2, which is a schematic view showing an LCD device according to a second embodiment of the present invention, compared with the above-described first embodiment, in the instant embodiment, a panel of the LCD device adopts a structure in which a color filter sheet is integrated with an array substrate (namely the so-called Color filter On Array (COA)). In other words, the color filter sheet that provides the function of color filtering is disposed on a TFT array substrate, namely the second function layer 22 of the upper substrate 20 comprises a TFT array layer and also comprises a color filter sheet. The lower substrate 10 does not include a color filter sheet. The first function layer 12 of the lower substrate 10 only comprises an ITO electrode layer, so as to further reduce the complication of the manufacturing process of the lower substrate 10 and simplify the structural complication of the lower substrate 10.

Further, in the instant embodiment, the first polarization layer 13 is disposed between the first function layer 12 and the liquid crystal layer 30 and is located above and on the first function layer 12. Since the ITO electrode layer of the first function layer 12 is directly formed on the first backing base plate 11, there is no such a potential risk in the manufacturing process of ITO resulting from surface roughness of the first polarization layer 13 and thus, the first polarization layer 13 of the lower substrate 10 is not provided with a planarization layer and to prevent the first polarization layer 13 from being damaged due to direct contact with the liquid crystal layer 30, a buffer layer (not shown) can be provided on one side of the first polarization layer 13 that is adjacent to the liquid crystal layer 30.

It is noted here that in the present invention, by using the advantages of being simple in respect of the manufacturing process and the structure of the lower substrate 10, the first polarization layer 13 associated therewith could be designed as an internally built structure and the first backing base plate 11 of the lower substrate 10 could serve as a light guide plate for the side-edge backlight source 40, so that there is no need to include an additional light guide plate and thus, the LCD device could possess an ultrathin modular structure with optimized displaying performance. The first and second embodiments described above provide an introduction to the application of the present invention to VA type LCDs; in addition thereto, the present invention is also applicable to embodiments of other types, such as in-plane switching (IPS) LCDs, namely an application where two electrode layers that controls liquid crystal molecules contained in a liquid crystal layer 30 to rotate are both arranged on the same substrate, wherein the lower substrate 10 may comprise no ITO electrode layer and the lower substrate 10 may just include the first backing base plate 11 and a first polarization layer 13 formed thereon to thereby further reducing the complication of the manufacturing process of the lower substrate 10 and also reducing the complication of the structure of the lower substrate 10.

In summary, the present invention provides an LCD device, which makes use of the advantages of a lower substrate of being simple in respect of the manufacturing process and the structure over those of a TFT array substrate to make an arrangement of a first polarization layer provided on the lower substrate an internally built structure with a first backing base plate of the lower substrate serving as a light guide plate for a side-edge backlight source so that there is no need to further include an additional light guide plate and thus making the LCD device feature an ultrathin modular structure with optimized displaying performance.

Based on the description given above, those having ordinary skills of the art may easily contemplate various changes and modifications of the technical solution and technical ideas of the present invention and all these changes and modifications are considered within the protection scope of the present invention defined in the appended claims.

What is claimed is:

1. A liquid crystal display (LCD) device, comprising a lower substrate and an upper substrate that are arranged opposite to each other, a liquid crystal layer arranged between the lower substrate and the upper substrate, enclosure sealant arranged on a peripheral position between the lower substrate and the upper substrate, and a side-edge backlight source disposed on one lateral side of the lower substrate;

wherein the lower substrate comprises a first backing base plate, a first polarization layer disposed on an inner side of the first backing base plate that is adjacent to the liquid crystal layer, and a light reflection film disposed on an outer side of the first backing base plate that is distant from the liquid crystal layer;

the first backing base plate comprises a lateral side surface and the side-edge backlight source is arranged to exactly correspond to the lateral side surface of the first backing base plate;

the first backing base plate comprises a bottom surface on the outer side, and the bottom surface is a surface of the first backing base plate that is distant from the liquid crystal layer, the bottom surface being provided thereon with a plurality of microstructures, the light reflection film set on and covering the bottom surface and the plurality of microstructures; and the upper substrate is a thin-film transistor (TFT) array substrate and comprises a second backing base plate, a second function layer disposed on one side of the second backing base plate that is adjacent to the liquid crystal layer, and a second polarization layer disposed on one side of the second backing base plate that is distant from the liquid crystal layer;

wherein the lower substrate further comprises a refraction layer that is arranged on the inner side of the first backing base plate that is adjacent to the liquid crystal layer and has an inner surface that is adjacent to the liquid crystal layer; wherein the first polarization layer is arranged on the inner surface of the refraction layer such that the refraction layer is disposed between the first polarization layer and the first backing base plate; and wherein the refraction layer has a refractive index that is greater than a refractive index of the first backing base plate.

2. The LCD device as claimed in claim 1, wherein the lower substrate further comprises a first function layer disposed on one side of the first backing base plate that is adjacent to the liquid crystal layer; and
the first function layer comprises an ITO electrode layer.

3. The LCD device as claimed in claim 2, wherein the first polarization layer is disposed between the first backing base plate and the first function layer; and
the lower substrate further comprises a planarization layer disposed between the first polarization layer and the first function layer.

4. The LCD device as claimed in claim 2, wherein the first polarization layer is disposed between the first function layer and the liquid crystal layer.

5. The LCD device as claimed in claim 1, wherein the lower substrate further comprises a first function layer disposed on one side of the first backing base plate that is adjacent to the liquid crystal layer; and the first function layer comprises a color filter sheet.

6. The LCD device as claimed in claim 1, wherein the second function layer comprises a TFT array layer and also comprises a color filter sheet.

7. The LCD device as claimed in claim 1, wherein the enclosure sealant comprises an ultraviolet (UV) curable resin material.

8. The LCD device as claimed in claim 1, wherein the first polarization layer and the second polarization layer are each an iodine series polarization layer or a dye series polarization layer.

9. The LCD device as claimed in claim 1, wherein the first backing base plate and the second backing base plate are glass plates.

10. A liquid crystal display (LCD) device, comprising a lower substrate and an upper substrate that are arranged opposite to each other, a liquid crystal layer arranged between the lower substrate and the upper substrate, enclosure sealant arranged on a peripheral position between the lower substrate and the upper substrate, and a side-edge backlight source disposed on one lateral side of the lower substrate;
wherein the lower substrate comprises a first backing base plate, a first polarization layer disposed on an inner side of the first backing base plate that is adjacent to the liquid crystal layer, and a light reflection film disposed on an outer side of the first backing base plate that is distant from the liquid crystal layer;
the first backing base plate comprises a lateral side surface and the side-edge backlight source is arranged to exactly correspond to the lateral side surface of the first backing base plate;
the first backing base plate comprises a bottom surface on the outer side, and the bottom surface is a surface of the first backing base plate that is distant from the liquid crystal layer, the bottom surface being provided thereon with a plurality of microstructures, the light reflection film set on and covering the bottom surface and the plurality of microstructures; and
the upper substrate is a thin-film transistor (TFT) array substrate and comprises a second backing base plate, a second function layer disposed on one side of the second backing base plate that is adjacent to the liquid crystal layer, and a second polarization layer disposed on one side of the second backing base plate that is distant from the liquid crystal layer;
wherein the lower substrate further comprises a refraction layer that is arranged on the inner side of the first backing base plate that is adjacent to the liquid crystal layer and has an inner surface that is adjacent to the liquid crystal layer; wherein the first polarization layer is arranged on the inner surface of the refraction layer such that the refraction layer is disposed between the first polarization layer and the first backing base plate; and wherein the refraction layer has a refractive index that is greater than a refractive index of the first backing base plate;
wherein the enclosure sealant comprises an ultraviolet (UV) curable resin material;
wherein the first polarization layer and the second polarization layer are each an iodine series polarization layer or a dye series polarization layer; and
wherein the first backing base plate and the second backing base plate are glass plates.

11. The LCD device as claimed in claim 10, wherein the lower substrate further comprises a first function layer disposed on one side of the first backing base plate that is adjacent to the liquid crystal layer; and
the first function layer comprises an ITO electrode layer.

12. The LCD device as claimed in claim 11, wherein the first polarization layer is disposed between the first backing base plate and the first function layer; and
the lower substrate further comprises a planarization layer disposed between the first polarization layer and the first function layer.

13. The LCD device as claimed in claim 11, wherein the first polarization layer is disposed between the first function layer and the liquid crystal layer.

14. The LCD device as claimed in claim 10, wherein the lower substrate further comprises a first function layer disposed on one side of the first backing base plate that is adjacent to the liquid crystal layer; and the first function layer comprises a color filter sheet.

15. The LCD device as claimed in claim 10, wherein the second function layer comprises a TFT array layer and also comprises a color filter sheet.

* * * * *